United States Patent [19]
Jonninen

[11] Patent Number: 6,010,551
[45] Date of Patent: Jan. 4, 2000

[54] METHOD AND APPARATUS FOR ACCELERATED BIODEGRADATION OF ORGANIC MATTER

[75] Inventor: Markku Jonninen, Lahti, Finland

[73] Assignee: Ideachip Oy, Finland

[21] Appl. No.: 08/985,437

[22] Filed: Dec. 5, 1997

[30] Foreign Application Priority Data

Jun. 12, 1997 [FI] Finland ..................... 972483

[51] Int. Cl.[7] .............. C05F 11/08; C05F 1/00; C02F 3/02
[52] U.S. Cl. ................... 71/9; 71/15; 210/620
[58] Field of Search .............. 71/9, 11; 210/620

[56] References Cited

U.S. PATENT DOCUMENTS

| | | | |
|---|---|---|---|
| 4,410,349 | 10/1983 | Laurenson, Jr. ..................... | 71/9 |
| 5,145,581 | 9/1992 | Novy et al. ........................ | 210/609 |
| 5,206,173 | 4/1993 | Finn ................................... | 435/313 |
| 5,459,071 | 10/1995 | Finn ................................... | 435/290.2 |

FOREIGN PATENT DOCUMENTS

| | | | |
|---|---|---|---|
| 0354606 | 7/1989 | European Pat. Off. ........ | C05F 17/02 |
| 2539777 | 7/1984 | France ............................... | E02F 5/22 |
| 2260883 | 6/1974 | Germany . | |
| 4345238 A1 | 10/1993 | Germany . | |
| WO9607724 | of 0000 | WIPO . | |
| WO 95/15933 | 6/1995 | WIPO ............................... | 71/9 |
| WO9607624 | 3/1996 | WIPO ............................... | C05F 17/00 |

*Primary Examiner*—Wayne Langel
*Assistant Examiner*—Maribel Medina
*Attorney, Agent, or Firm*—Howard & Howard

[57] ABSTRACT

The invention relates to a method and an apparatus for accelerated biodegradation of organic matter. The apparatus includes an enclosure for receiving a stack of organic matter and at least one fan connected to a series of aeration ducts for directing a gas containing oxygen through the stack. After passing through the stack the gas is collected and passed through a scrubber and a heat exchanger that cools the gas. A portion of the gas is exchanged with a portion of a replacement gas and then the gas is recirculated through the stack in a substantially closed loop system. The temperature, oxygen content, and flow rate of the gas are controlled to provide a sustained accelerated rate of biodegradation in the stack. In addition, the stack is periodically agitated.

11 Claims, 2 Drawing Sheets

METHOD AND APPARATUS FOR ACCELERATED BIODEGRADATION OF ORGANIC MATTER

BACKGROUND OF THE INVENTION

This invention generally relates to a method and an apparatus for the biodegradation of organic matter and, more particularly, to a method and an apparatus capable of accelerated biodegradation of organic matter.

A typical method of biodegrading organic matter is a compost pile wherein bacteria are used to biodegrade the organic matter. During the biodegradation process the bacteria consume oxygen and produce primarily carbon dioxide, water, and energy. The energy is predominantly released as heat. The amount of heat generated in the center or core of the compost pile is sufficient to convert the water produced into water vapor, which diffuses outwardly from the center of the compost pile. To sustain the biodegradation process it is necessary to replace the oxygen consumed by the bacteria and to dissipate the heat produced during the biodegradation process. Failure to either replace the oxygen or dissipate the heat can kill the bacteria.

Dissipation of the heat generated in a typical compost pile occurs in several ways including convection, radiation, and emission of exhaust gasses including water vapor. In a typical compost pile the rate of heat dissipation is much greater at the outer surface than at the core. This differential heat loss creates a temperature differential between the core and the surface of the compost pile. The core of a typical compost pile reaches temperatures in excess of 50° C. to 65° C., while the surface of the compost pile remains at about the ambient temperature of the surrounding air, typically 25° C. Such high core temperatures, if sustained, can kill the bacteria in the core of the compost pile. In addition, the temperature differential causes the water vapor diffusing from the core of the compost pile to condense on the surface of the compost pile and the condensed water percolates back into the compost pile.

Unless the compost pile is periodically agitated, depletion of oxygen occurs, especially at the core of the compost pile, because the oxygen cannot diffuse to the core as rapidly as the oxygen is initially consumed by the bacteria during the biodegradation process. The net result of the lack of dissipation of heat from the core of the compost pile and failure to replace the oxygen in the compost pile is that the steady-state biodegradation rate reaches an equilibrium that is very slow compared to the potential biodegradation rate.

In a typical compost pile the energy generated as heat is lost because this energy is not efficiently captured when produced and the condensation of water vapor on the surface of the compost pile further recaptures energy produced by the biodegradation and returns it to the pile.

Therefore, it is desirable to provide a method and apparatus which will permit more efficient control of the rate of heat transfer from the compost pile to the surrounding atmosphere and more efficient regulation of the oxygen content within the compost pile to achieve a maximal biodegradation rate in the pile. In addition, it is furthermore desirable to capture the energy produced by the biodegradation of the organic matter.

SUMMARY OF THE INVENTION

In general terms, this invention provides a thermally controlled flow of a gas containing oxygen through a stack of organic matter in combination with a periodic agitation of the stack to produce a sustainable and accelerated rate of biodegradation.

Preferably, a stack of organic matter is arranged within an enclosure. The enclosure includes a set of aeration ducts and at least one fan for directing a flow of a gas containing oxygen through the stack. The gas diffuses out of the stack and is collected. The collected gas is circulated through a scrubber to remove built up ammonia and particulates in the gas. The gas is cooled and a portion of the collected gas is exchanged with a portion of a replacement gas, having a higher oxygen content, to maintain the oxygen content of the gas. The cooled and re-oxygenated gas is then recirculated through the stack in a substantially closed loop system. The enclosure also includes an agitator for periodically mixing the organic matter in the stack. At least one spray pipe is included in the enclosure for periodically moistening the stack.

The method of the invention comprises the steps of substantially enclosing a stack of organic matter, circulating a gas containing oxygen through the stack in a substantially closed loop system, scrubbing and cooling the gas, adjusting the flow rate and the cooling of the gas to establish and maintain a lower temperature at a gas input in a bottom side of the stack and a higher temperature at a top side and a pair of outer sides of the stack, re-oxygenating the gas, and periodically agitating the organic matter within the stack.

The invention permits relatively precise control over the parameters of temperature and oxygen content within the stack. Manipulation of these parameters permits biodegradation to occur at a greatly accelerated rate compared to a traditional composting operation. In addition, the invention permits the energy generated by the biodegradation to be captured and utilized.

These and other features and advantages of this invention will become more apparent to those skilled in the art from the following detailed description of the presently preferred embodiment. The drawings that accompany the detailed description can be described as follows.

DETAILED DESCRIPTION OF THE PREFERRED EMBODIMENT

Figure 1:
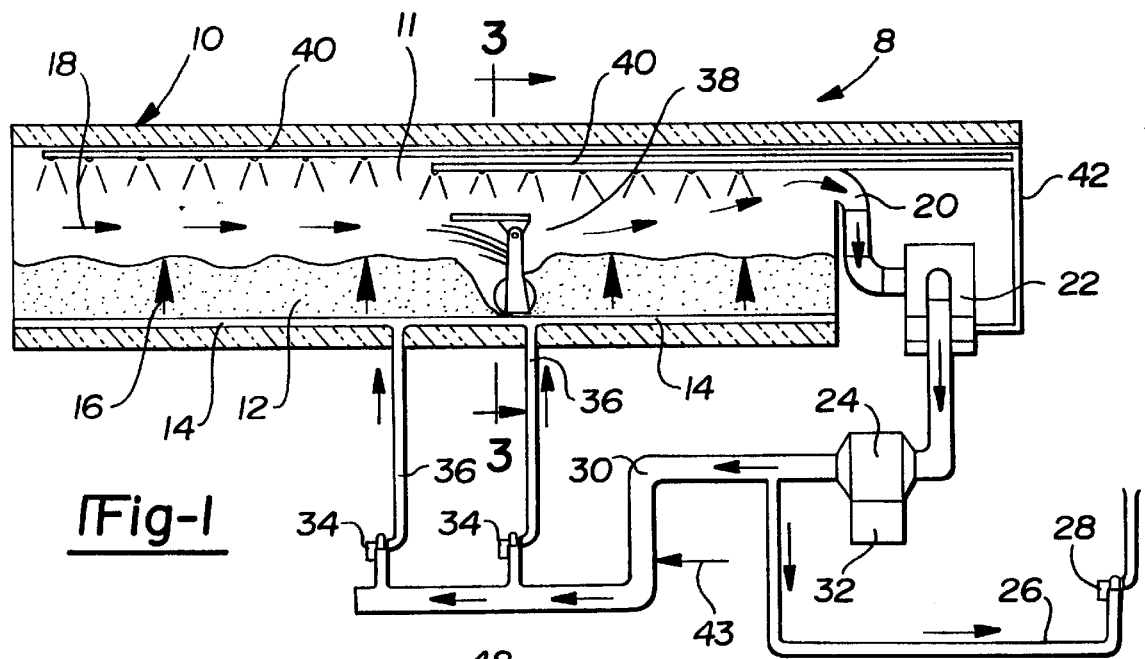
FIG. 1 is a schematic view of an apparatus designed in accordance with the present invention.

In FIG. 1 an apparatus for accelerated biodegradation is shown generally at 8. The apparatus 8 includes an enclosure 10 having a space 11 for receiving a stack 12 of organic matter. The enclosure 10 is thermally insulated but does not need to be air tight. The stack 12 may have a height of two meters and length of several tens or hundreds of meters. A set of aeration ducts 14 provide a gas input within the enclosure 10 and are arranged under the stack 12. Large arrows 16 show the diffusion of a gas containing oxygen through the stack 12. Small arrows 18 show the flow of the gas outside the stack 12. The gas containing oxygen passes out of the stack 12, through an air collection duct 20, and into a scrubber 22. The scrubber 22 removes particulates and ammonia from the gas. Gas from the scrubber 22 passes through a heat exchanger 24 to cool the gas and capture the energy produced by the biodegradation. A portion of the gas leaving the heat exchanger 24 is removed through an exhaust duct 26 by an exhaust vent 28. The remainder of the gag passes through a cool gas conduit 30 to a set of fans 34. Optionally, a gas dehydrator 32 can be included as a portion of the heat exchanger 24 or as a separate unit connected to cooling gas conduit 30. The gas dehydrator 32 may be of a conventional droplet separator type as known in the art. Fans 34 drive the gas containing oxygen up through a set of ducts 36 into aeration ducts 14 and through the stack 12 in a recirculating substantially closed loop system. An agitator 38 is located within the stack 12. Additionally, a set of spray pipes 40 can be located over the stack 12 and connected to the scrubber 22 through a conduit 42. An optional adjustable air intake duct 43 can he connected to cooling gas conduit 30 to provide a portion of a replacement gas to the remainder of the gas.

Figure 2:
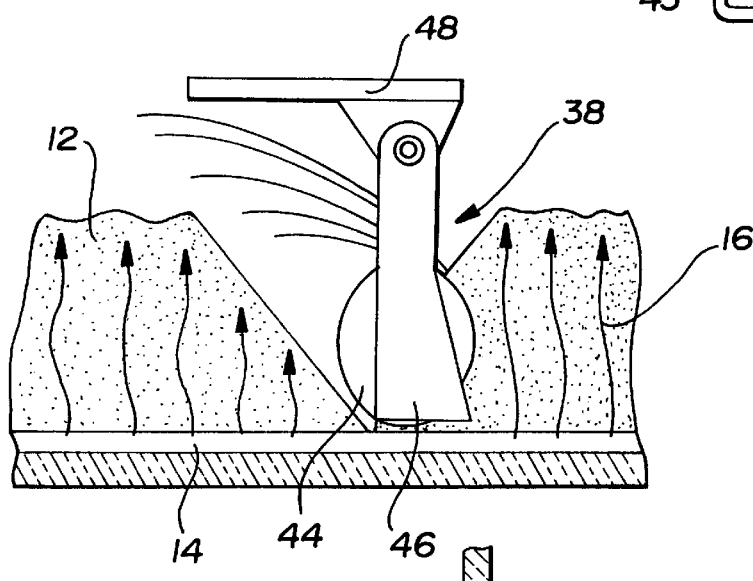
FIG. 2 is a side view of an agitator designed in accordance with this invention.

In FIG. 2 a side view of the agitator 38 is shown. The agitator 38 includes a rotating impeller 44 supported on the lower end of a pair of brackets 46. A deflector 48 is supported on the upper end of the pair of brackets 46.

Figure 3:
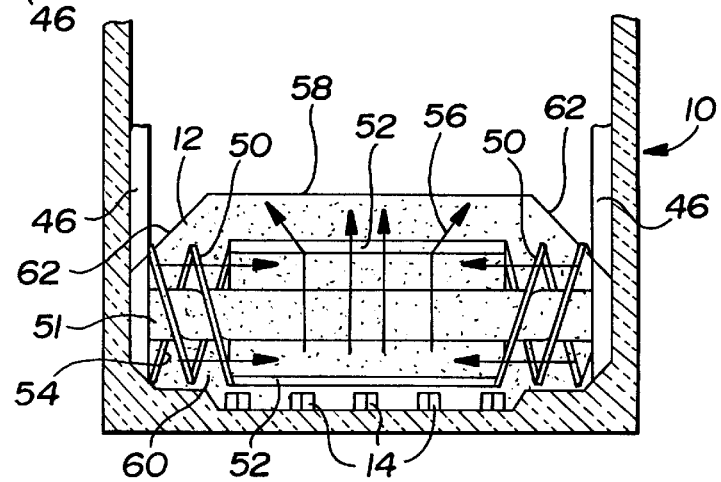
FIG. 3 is a partial front view of the agitator shown in FIG. 2.

In FIG. 3 a partial front end view of the agitator 38 along lines 3—3 of FIG. 1 is shown. The agitator 38 includes a shaft 51 having a pair of helical auger sections 50 adjacent each of the brackets 46. A plurality of paddles 52 are mounted to the shaft 51 between the pair of helical auger sections 50. Rotation of the shaft 51 and its' paddles 52 moves organic matter from a bottom side 60 of the stack 12 toward a top side 58 of the stack as shown by arrows 56. Rotation of the shaft 51 and its' helical auger portions 50 moves organic matter from the outer sides 62 toward the center of the stack 12 as shown by arrows 54.

Figure 4:
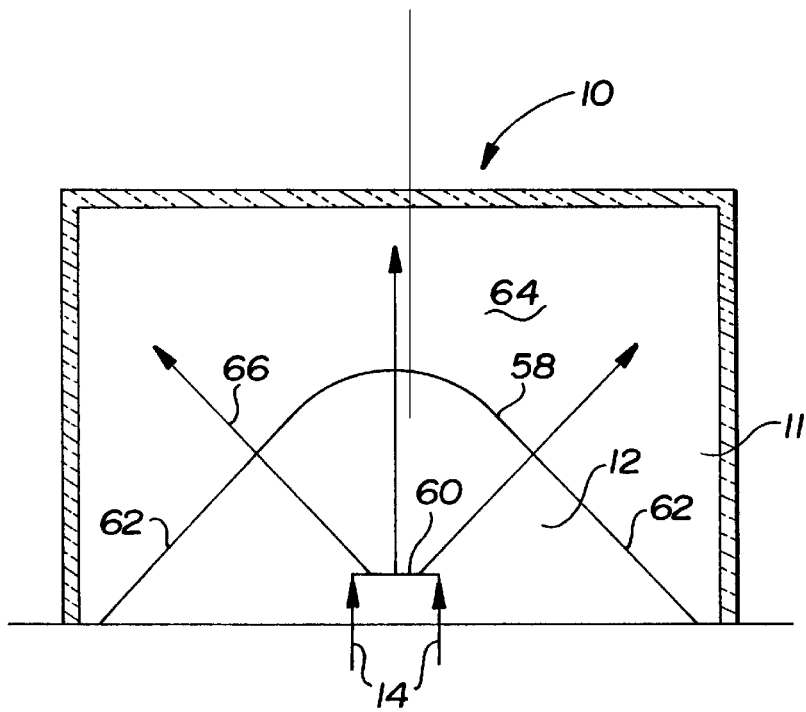
FIG. 4 is a diagram illustrating temperature distribution within a cross section of a stack of organic matter.

FIG. 4 is a diagrammatic view of a cross section of the stack showing temperature distribution. The temperature at the bottom side 60 of the stack 12 near the aeration ducts 14 is much lower than at the top side 58 and the outer sides 62 of the stack 12. The temperature at the top side 58 and the outer sides 62 of the stack 12 is approximately equal to the temperature of an outer gas layer 64. Heat radiates outwardly along a set of heat paths 66 from the aeration ducts 14 in the bottom side 60 toward the top side 58 and the outer sides 62 of the stack 12.

Figure 5:
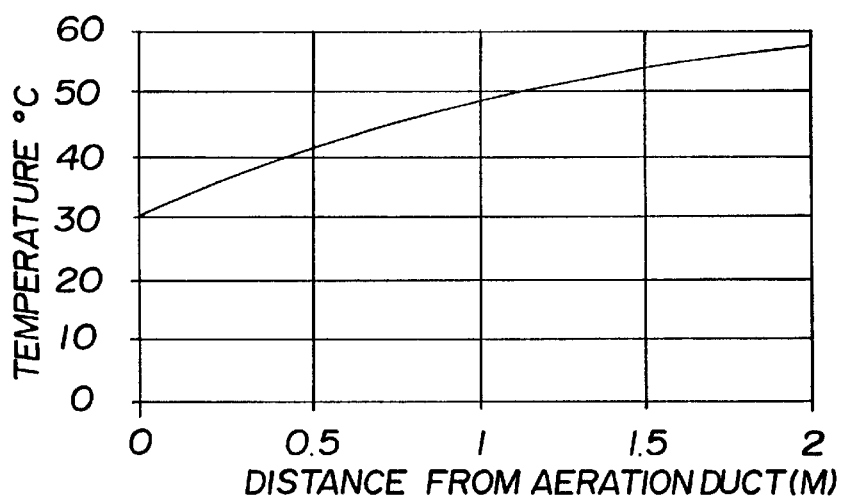
FIG. 5 is a graph representing the preferred temperatures within the stack measured at various distances from an aeration duct in a bottom side of the stack.

In FIG. 5 a graph representing the preferred temperatures within the stack 12 at various distances from the aeration ducts 14 in the bottom side 60 of the stack 12 is shown. The temperature of the stack 12 increases between the aeration ducts 14 and the top side 58 and the outer sides 62 of the stack 12.

Figure 6:
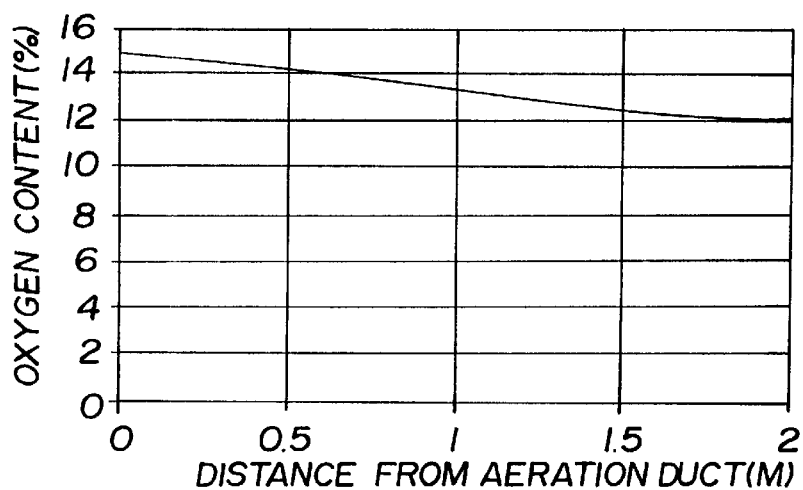
FIG. 6 is a graph representing the preferred oxygen content of a gas in the stack at various distances from the aeration duct in the bottom side of the stack.

In FIG. 6 a graph is shown illustrating the preferred oxygen content of the gas at various distances from the aeration ducts 14 in the bottom side 60 to the top side 58 and the outer sides 62 of the stack 12 as the gas diffuses through the stack 12. As shown in the FIG. 6, the oxygen content decreases as the distance increases from the aeration ducts 14 because the oxygen is being utilized by the bacteria.

As will be understood and appreciated by those of ordinary skill in the art the apparatus and method of this invention are best suited toward large scale composting, but they can also be applied to smaller scale composting.

In practicing the method of this invention, there are several critical parameters. First, the oxygen content of the circulating gas within the stack 12 must be at least 10% to maintain bacterial biodegradation. Typically, the oxygen content is maintained in the range of 10%–18%, with the most preferred range being 12%–16%. A portion of the circulating gas is exchanged with a portion of a replacement gas to maintain the oxygen content by any of several means. A first means is through exhaust vent 28 alone. Because the apparatus is a substantially closed loop system, running exhaust vent 28 results in a vacuum that draws the portion of the replacement gas into the enclosure 10 through cracks and leaks in the enclosure 10. Ambient air, the replacement gas, has a higher oxygen content than is required by the method, therefore this means can be used to maintain the oxygen content of the gas. As an alternative means, exhaust vent 28 can be run in combination with adjustable air intake duct 43 to provide a more controlled and repeatable exchange of the portion of the replacement gas. When using either means of exchanging a portion of the gas, the amount of gas exchanged each time should never exceed more than 30% and preferably about 10% of the gas is exchanged.

Second, the temperature differential within the stack should be within the range shown in FIG. 5. Namely, the gas is introduced through the aeration ducts 14 into the bottom side 60 of the stack 12 at between 30° C. to 45° C. and most preferably at about 30° C. The temperature of the gas at the aeration ducts 14 is regulated by both the rate of flow of the gas and the amount of cooling of the gas in heat exchanger 24. The temperature of the gas at the top side 58 and outer sides 62 of the stack 12 should be at about 50° C. to 65° C., and most preferably at about 55° C. This temperature differential promotes accelerated rates of biodegradation. The temperature differential produced by this method is the reverse of that found in a typical compost pile, which has a higher core temperature and a lower surface temperature. The temperature differential of the present method prevents the condensation of water vapor on the top side 58 and outer sides 62 of the stack 12 as would occur in a typical compost pile. In addition, the heat exchanger 24 captures the large amount of heat generated by the biodegradation process for use in other processes. The size of the enclosure 10 also enables large amounts of heat to be generated and trapped from the biodegradation process.

Third, agitation of the stack 12 is necessary to facilitate the accelerated biodegradation rate. This is accomplished by running the agitator 38 completely through the stack 12 at intervals of approximately every 5–10 hours. The design of the agitator 38 permits a complete redistribution of the organic matter within the stack 12.

Fourth, during the biodegradation process, ammonia accumulates in the gas containing oxygen. If the ammonia is not removed from the gas containing oxygen it will inhibit the biodegradation process. In addition, the ammonia changes the pH of the gas containing oxygen. Therefore, the scrubber 22 is necessary to remove ammonia and solid particulates from the gas and to maintain the pH of the gas. The scrubber 22 may include a sulfuric acid solution to remove the ammonia.

Finally, by varying the flow rate of the gas, the amount of cooling of the gas, and the oxygen content of the gas the biodegradation rate can be enhanced several fold over that found in a typical compost pile. The method can be applied to the biodegradation of both slurries and solid organic matter.

The foregoing description is exemplary rather than limiting in nature. Variations and modifications to the disclosed embodiment may become apparent to those skilled in the art and do come within the scope of this invention. Accordingly, the scope of legal protection afforded this invention can only be determined by studying the following claims.

We claim:

1. A method for accelerated biodegradation of organic matter, said method comprising the steps of:
    (a) substantially enclosing a stack of organic matter, the stack having a top side, a bottom side, and a pair of outer sides;
    (b) introducing a gas having an oxygen content of between 10% to 18% and a temperature of between 30° C. to 45° C. to the bottom side of the stack;
    (c) circulating the gas containing oxygen through the stack;
    (d) collecting the gas after it exits the stack;
    (e) cooling the gas to a temperature of between about 30° C. to 45° C. and adjusting the oxygen content to between 10% to 18% prior to recirculating the gas to the bottom side of the stack in a substantially closed loop system;
    (f) adjusting the recirculation rate and the amount of cooling of the gas to establish and maintain a temperature gradient between the bottom side and the top side and outer sides within the stack with a lower temperature at a gas input in the bottom side and a higher temperature at the top side and the outer sides of the stack; and
    (g) agitating the organic material in the stack periodically.

2. A method as set forth in claim 1, wherein the method further includes a step of exchanging a portion of no more than 30% of the flow of the gas from the substantially closed loop system with a portion of a replacement gas containing a higher oxygen.

3. A method as set forth in claim 2, wherein the method includes exchanging the portion of the gas by drawing the portion of the replacement gas in through leaks in the substantially closed loop system.

4. A method as set forth in claim 2 further including introducing the portion of the replacement gas into the substantially closed loop system through an adjustable air intake duct.

5. A method as set forth in claim 1, wherein steps (e) and (f) are performed to establish and maintain a temperature gradient of from about 30° C. to 45° C. at the gas input in the bottom side of the stack and a temperature of about 55° C. to 65° C. at the top side and outer sides of the stack.

6. A method as set forth in claim 1, further including the step of scrubbing the hot collected gas from step (d) with a solution containing acid to remove ammonia and maintain the gas at about pH 7 prior to step (e).

7. A method as set forth in claim 6, wherein the step of scrubbing the gas includes the further step of dehydrating the gas after step (e).

8. A method as set forth in claim 1, wherein step (g) further comprises moving organic matter from the outer sides of the stack toward each other and from the bottom side of the stack toward the top side of the stack.

9. A method as set forth in claim 6, wherein the pressure of the gas that is being scrubbed is reduced below the atmospheric pressure, thereby producing a partial vacuum in the substantially closed loop system.

10. A method as set forth in claim 6, further comprising the step of venting a portion of the gas to the atmosphere after the gas has been scrubbed.

11. A method as set forth in claim 1, wherein the method further includes a step of moistening the stack through at least one spray pipe.

* * * * *